United States Patent [19]

Hongo

[11] Patent Number: 4,630,308
[45] Date of Patent: Dec. 16, 1986

[54] CHARACTER READER

[75] Inventor: Yasuo Hongo, Tokyo, Japan

[73] Assignees: Fuji Electric Corporate Research & Development Ltd.; Fuji Electric Company Ltd., both of Kawasaki, Japan

[21] Appl. No.: 633,114

[22] Filed: Jul. 20, 1984

[30] Foreign Application Priority Data

Aug. 4, 1983 [JP] Japan .................................. 58-141858

[51] Int. Cl.⁴ ................................................ G06K 9/56
[52] U.S. Cl. ........................................ 382/27; 382/30; 382/34
[58] Field of Search ........................ 382/27, 30, 33, 34

[56] References Cited

U.S. PATENT DOCUMENTS

| | | | |
|---|---|---|---|
| 3,104,372 | 9/1963 | Rabinow et al. | 382/50 |
| 3,178,688 | 4/1965 | Hill et al. | 382/26 |
| 3,576,534 | 4/1971 | Steinberger | 382/34 |
| 3,601,802 | 8/1971 | Nakagome et al. | 382/37 |
| 3,618,016 | 11/1971 | Steenis | 382/30 |
| 3,713,099 | 1/1973 | Hemstreet | 382/34 |
| 3,846,754 | 11/1974 | Oka et al. | 382/55 |
| 4,027,284 | 5/1977 | Hoshino et al. | 382/30 |
| 4,110,737 | 8/1978 | Fahey | 382/23 |
| 4,162,482 | 7/1979 | Su | 382/55 |
| 4,183,013 | 1/1980 | Agrawala et al. | 382/9 |
| 4,288,782 | 9/1981 | Bader et al. | 382/30 |
| 4,371,865 | 2/1983 | Moulton | 382/27 |
| 4,398,256 | 8/1983 | Nussmeier et al. | 382/41 |
| 4,556,985 | 12/1985 | Hongo | 382/30 |

OTHER PUBLICATIONS

"Automatic Visual Sorting Method of Compressors with Stamped Marks", by A. Komura & K. Edamatsu, 1980, IEEE, pp. 245–247.

"A Fast Interval Processor", by G. A. Shippey, R. J. H. Bayley, A. S. J. Farrow, D. R. Rutovitz and J. H. Tucker, MRC Clinical and Population Cytogenetics Unit, Edinburgh, U.K., Pattern Recognition vol. 14, Nos. 1–6, pp. 345–365, (1981).

"Portable Scanner Reads Handwritten Letters and Figures", by Douglas Glucroft, McGraw-Hill World News, Electronics/Apr. 7, 1981.

"Application of Random Pattern Recognition Technique to Quantative Evaluation of Automatic Visual Inspection Algorithms", by K. Edamatsu, A. Komuro and Y. Nitta, 1982, IEEE, pp. 139–143.

"Stamped Character Inspection Apparatus Based on the Bit Matrix Method", by Y. Hongo and A. Komuro, 1982, IEEE, pp. 448–450.

"Digital Pattern Recognition by Moments", in Optical Character Recognition, by F. L. Alt, edited by G. L. Fischer et al., Spartan Books, 1962, pp. 153–179.

"The RCA Multi-Font Reading Machine", pp. 3–14, by W. J. Hannan Radio Corporation of America, Defense Electronics Products.

Primary Examiner—Leo H. Boudreau
Assistant Examiner—Jacqueline Todd
Attorney, Agent, or Firm—Brumbaugh, Graves, Donohue & Raymond

[57] ABSTRACT

In the particular embodiment of the invention described in the specification, the identity of an unknown character is determined by comparing matrices representing the unknown character with matrices representing known characters and determining the deviation beween matrices for the unknown and each known character. To obtain the matrices to be compared, a transformation chain is expressed in terms of horizontal, vertical and diagonal vectors, permitting all types of transformation chains to be used. Two-dimensional memory units having superposed shift registers are used in comparing matrices to determine minimum deviation.

5 Claims, 41 Drawing Figures $D_4$ $D_3$ $D_2$ $D_5$

B $D_1$ $D_6$ $D_7$ $D_8$

CHARACTER READER

BACKGROUND OF THE INVENTION

The present invention relates to a character reader and, more particularly, to an optical character reader utilizing bit matrix comparison carried out by a deviation calculating circuit.

It is generally desirable that an optical character reader be capable of recognizing characters accurately at the highest possible speed. One pattern recognition system for accomplishing high speed reading of characters has been proposed in the copending U.S. application Ser. No. 573,810 filed Jan. 25, 1984 and assigned to the same assignees as the present application. This copending application is incorporated herein by reference. Although the system disclosed in that application provides character recognition at high speeds, even higher character reading speeds are desirable.

SUMMARY OF THE INVENTION

In accordance with the invention, a character reader is provided wherein a transformation chain which acts on the bit matrix of an unknown pattern is divided into a predetermined number of transformation element bit matrices in accordance with stored operating instructions. The character reader has a transformation operation calculation circuit which performs an AND operation between each transformation element bit matrix and the unknown bit matrix and successively reads out the AND operation results through a predetermined number of two-dimensional local memories to subject the results to an OR operation. The reader then carries out an AND operation between the OR operation result and a mask bit matrix, and the output of the transformation operation calculation circuit is XORed with a separately stored standard bit matrix to obtain the deviation between the unknown pattern and each dictionary pattern by using the calculation circuit.

BRIEF DESCRIPTION OF THE DRAWINGS

An embodiment of the present invention will be described hereinafter with reference to the accompanying drawings, in which.

DESCRIPTION OF A PREFERRED EMBODIMENT

Figure 1:
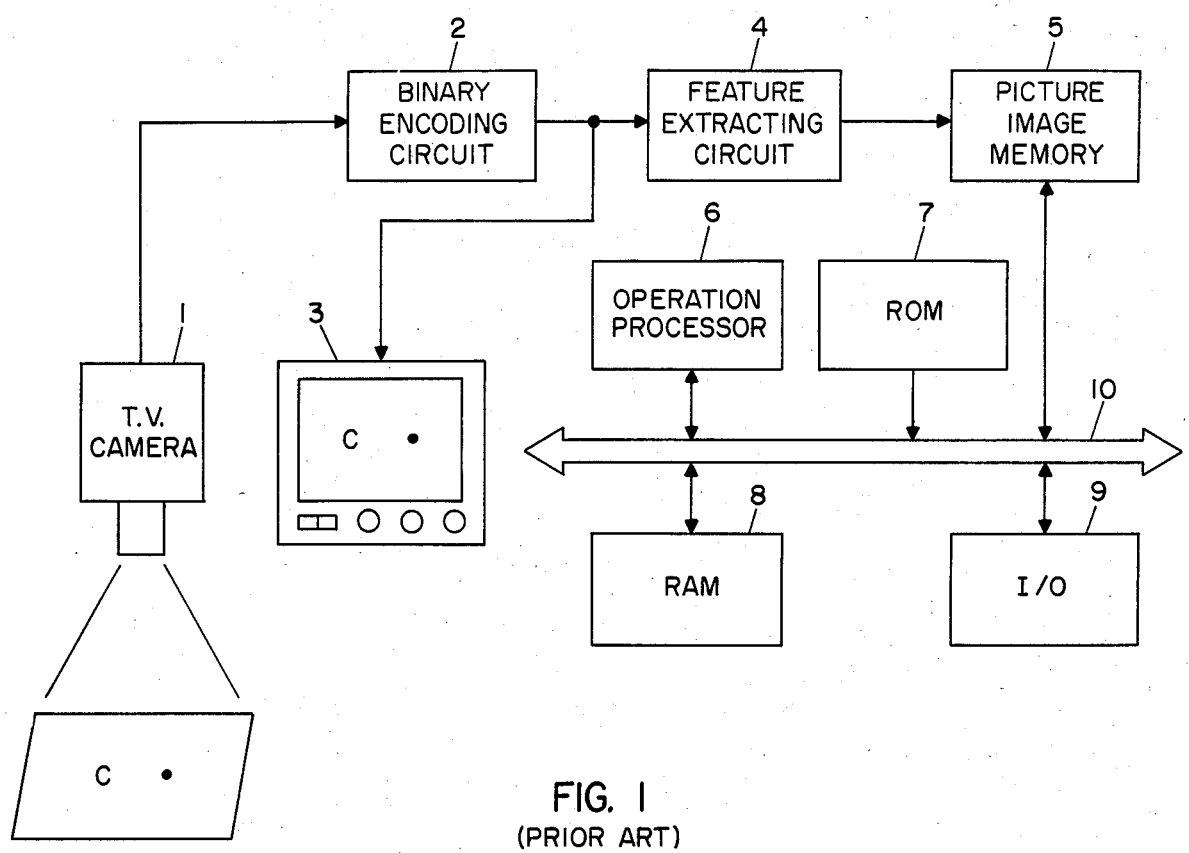
FIG. 1 is a schematic block diagram illustrating the overall arrangement of a conventional character reader.

Illustrated in FIG. 1 is the construction of a conventional optical character reader which includes an image pickup unit 1, such as an industrial television camera (ITV), a binary encoding circuit 2, a monitor television 3, a feature-extracting circuit 4, a picture image memory 5, an operational processor such as a microcomputer 6, a programmable read only memory (ROM) 7, a temporary random-access memory (RAM) 8, an input/output interface (I/O) 9, and a system bus 10.

Figure 1A:
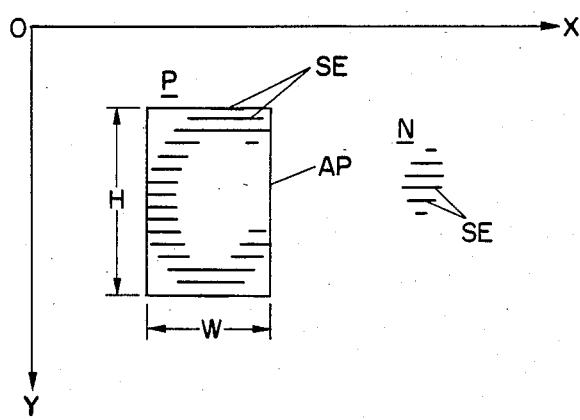
FIG. 1A is a diagrammatic illustration useful in describing the method of processing a typical character image.

In the operation of the conventional optical character reader shown in FIG. 1, a pattern representing a character or numeral as an object to be subjected to the image pickup operation is converted into a video signal by the image pickup unit 1 which successively repeats horizontal (X-direction) scanning while scanning in the vertical (Y) direction. The binary encoding circuit 2 encodes the received information so that a background portion is represented by a "0" and a portion of pattern is represented by a "1". If a series of picture elements each represented by a "1" is referred to as "segment", the pattern of the object can be represented by a group of segments SE as shown in FIG. 1A. It is to be noted that, in FIG. 1A, the reference symbol P denotes a character pattern, while the symbol N denotes noise, which also can be regarded as being constituted by segments.

The feature-extracting circuit 4 of FIG. 1 extracts various data, such as the X-Y coordinates of the starting end or terminating end of each of the segments SE and the length of each segment SE, and the memory 5 stores these data. The operational processor 6 executes the processing steps represented in FIG. 1B based on the contents of the memory 5.

More specifically, each of the above-mentioned segments SE is given a segment number in accordance with the order of generation thereof. Further, each segment is given a compound segment or pattern number which is obtained by analyzing the overlap between the related segments, and the segments are segregated into patterns. Each of the patterns thus segregated must have a predetermined size if it is an object to be inspected or identified. Therefore, any patterns which are smaller or larger than the predetermined size are excluded as noise (see FIG. 1B(b)). Accordingly, the noise N shown in FIG. 1A is removed from the patterns which are to be identified or inspected.

Figure 1B:
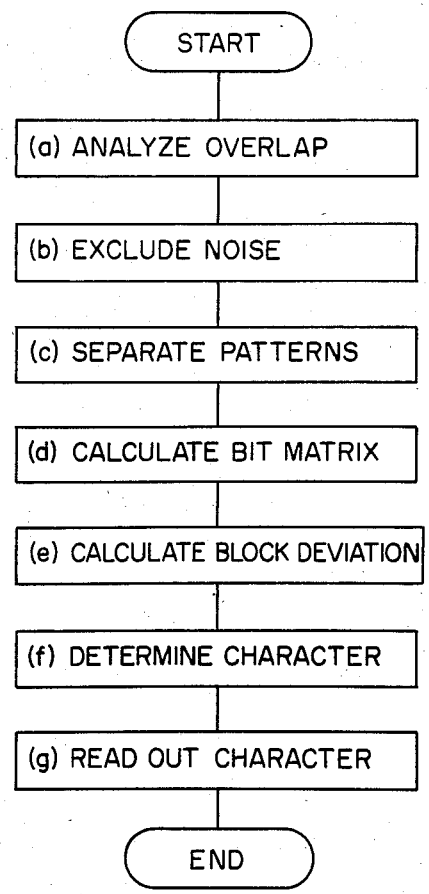
FIG. 1B is a schematic flow chart useful in describing the operation of the operational processor in the reader of FIG. 1.

Thereafter, an imaginary frame having a predetermined width W and height H, as shown by the symbol AP in FIG. 1A, is imposed to effect separation of the patterns (see FIG. 1B(c)). Each of the separated patterns is then divided into a predetermined number (N in the horizontal direction and M in the vertical direction) of meshes. A "1" or a "0" is given to each mesh according to whether or not the mesh includes at least part of one segment, thereby allowing each pattern to be expressed by a matrix having a predetermined size (N×M). The matrix thus prepared is referred to as a "bit matrix B" and the bit matrix is calculated in step (d) of FIG. 1B. The elements or bits constituting the bit matrix for each pattern include elements which are always "1" or always "0" as well as elements which may be either "0" or "1". Therefore, the elements are classified into the following four kinds:

(a) pattern elements: those which are always "1".
(b) blank elements: those which are always "0".
(c) mask elements: those which may be either "1" or "0".
(d) transformation elements: those which constitute transformation chains.

Figure 2:
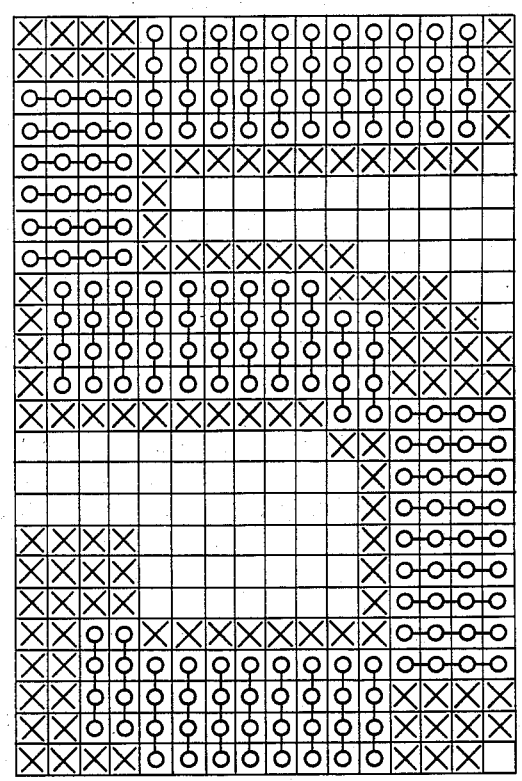
FIG. 2 is a diagram showing the cluster expression form of the numeral "5"

If a numeral "5", for example, is expressed by using the above-mentioned elements, the result is as shown in FIG. 2 which is a schematic illustration showing the bit matrix representing the numeral "5". In FIG. 2, the mark "o" represents a transformation element, the mark "o-o-o" represents a transformation chain constituted by a plurality of transformation elements, the mark "x" represents a mask element, and each blank part represents a blank element. In this case, the pattern elements are included in the transformation elements and are not separately employed. The expression of each pattern in this manner will be referred to as a "clusterization" of patterns, and the clusterized matrix is referred to as a "cluster matrix", hereinafter.

Since the cluster matrix cannot be used unless it is somewhat modified, the following various quantities are defined which respectively represent the various kinds of elements constituting the cluster matrix, i.e., a standard bit matrix $B_S^K(i,j)$ which is represented by a "1" when the constituent element is a pattern element or a transformation element and by a "0" when the constituent element is other than a pattern element or a transformation element, and a mask bit matrix $B_M^K(i,j)$ which is represented by a "1" when the constituent element is other than a mask element and by a "0" when the constituent element is a mask element.

In addition, a transformation operator $D^K$ which acts on unknown bit matrix $B(i,j)$ is used. The operation effected by the transformation operator $D^K$ is expressed by $D^K(B(i,j))$, by which, when at least one of the various elements constituting the unknown bit matrix $B(i,j)$ corresponding to a transformation chain is "1", all the transformation elements constituting the transformation chain become "1" and, in the other cases, $B(i,j)$ is left as it is, that is, kept invariable. As a result, it is possible to obtain a matrix equal in size to the matrix $B(i,j)$. The above is arranged as follows:

$$B(i,j) = \begin{cases} \text{"1" for each pattern or transformation element.} \\ \text{"0" for each element other than a pattern or transformation element.} \end{cases}$$

$$B(i,j) = \begin{cases} \text{"1" for each element other than a mask element.} \\ \text{"0" for each mask element.} \end{cases}$$

$$(B(i,j)) = \begin{cases} \text{"1" when at least one of the elements of } B(i,j) \text{ corresponding to a transformation chain is "1".} \\ B(i,j) \text{ in all other cases.} \end{cases}$$

Figure 3:
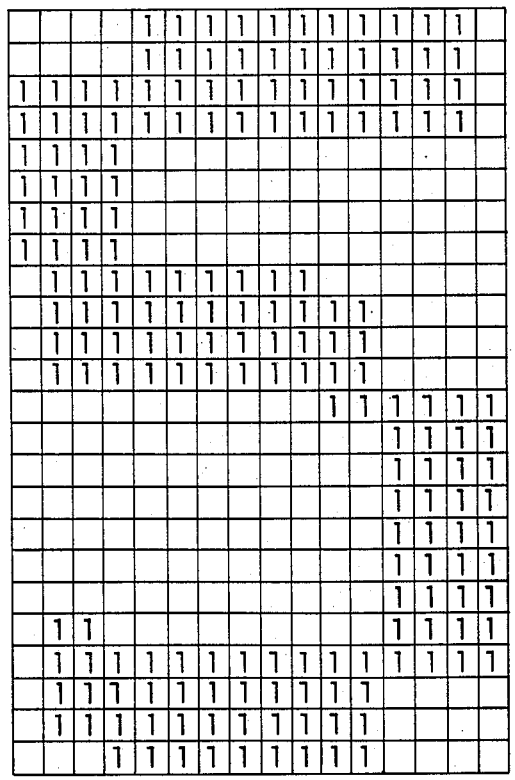
FIG. 3 is a diagram showing the standard bit matrix for the numeral "5" corresponding to FIG. 2.
Figure 4:
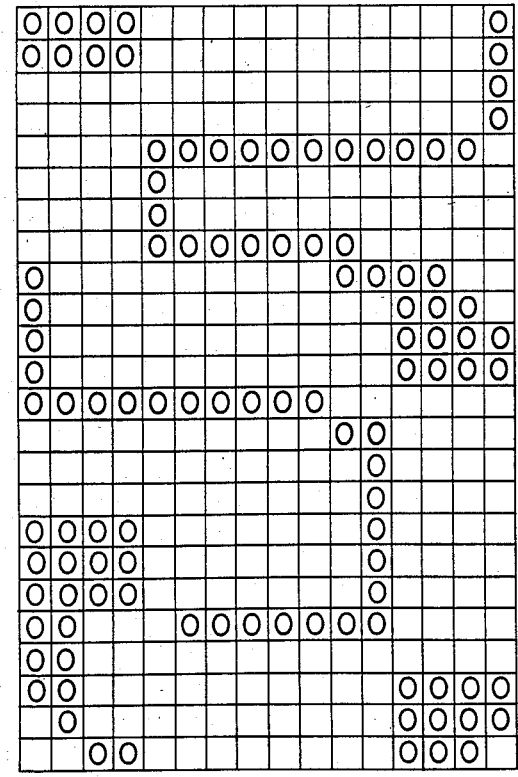
FIG. 4 is a diagram showing the mask bit matrix of the numeral "5"

FIGS. 3 and 4 illustrate respectively such a standard bit matrix $B_S^K(i,j)$ and mask bit matrix $B_M^K(i,j)$. It is to be noted that the illustrated matrices are for the numeral "5", and that "0" and "1" are placed in each of the blank parts in FIGS. 3 and 4, respectively. In addition, the standard bit matrix $B_S^K$ and the mask bit matrix $B_M^K$ corresponding to a character or pattern are respectively stored in predetermined memories as dictionary patterns.

Next, by employing the various quantities thus defined, the deviation $D^K(B)$ between the unknown pattern $B(i,j)$ and a predetermined character K is defined by the following equation:

$$D^K(B) = \sum_{i=1}^{M} \sum_{j=1}^{N} [B_S^K(i,j) \oplus \{B_M^K(i,j) \cdot D^K(B(i,j))\}] \quad (1)$$

It is to be noted that in the equation (1): the symbol "$\oplus$" represents an exclusive-OR operation, "." represents an AND operation; and "$\Sigma$" represents an arithmetic summation. Thus, it is possible to obtain the set of deviations $\{D^K(B)\}$ for all of the patterns. The minimum value $D_1$ of the set of deviations for a character pattern $K_0$ and the second smallest deviation $D_2$ are determined, and the unknown pattern $B(i,j)$ is judged to be the character $K_0$ when the above-mentioned values satisfy the following conditions:

$$D_1 \geqq D_U$$

$$D_2 - D_1 \geqq D_L \quad (2)$$

It is to be noted that the symbols $D_U$ and $D_L$ respectively denote upper and lower limit set values which are experimentally obtained.

In obtaining the deviation $D^K$ between an unknown pattern B and each dictionary pattern in the above-mentioned manner, as the number of kinds of pattern increases, the number of times of calculation of the equation (1) increases, and the processing time also increases. In order to reduce the number of calculations required to determine the unknown character, therefore, the bit matrix may be divided into a predetermined number of blocks to carry out the deviation calculation for each block, and the operation of removing any pattern which increases in deviation is repeated to narrow the number of patterns down to a small number of patterns each having a small cumulative value of deviation for each block, thereby reducing the number of calculations and increasing the speed of operation.

This method is carried in the block deviation calculation shown in FIG. 1B(e) and has been proposed in the above-mentioned copending application. It is to be noted that, upon completion of the calculation of the deviation $D^K$, the character determination is made (see FIG. 1B(f)) on the basis of the value of the calculated deviation $D^K$ by making the comparison shown by the relations (2) above, and the result is read out (see FIG. 1B(g)) to complete the series of process steps.

According to the foregoing method, when a four-digit figure is to be read, for example, the read time can be reduced to about 1.3 seconds from 2 to 3 seconds, which is the time required for reading in other methods. A higher operation speed cannot be attained by, for example, selecting a high-speed microprocessor. Therefore, it has been desirable to provide circuitry to carry out the deviation calculation, which accounts for the main part of the processing time, at a higher speed.

Figure 5:
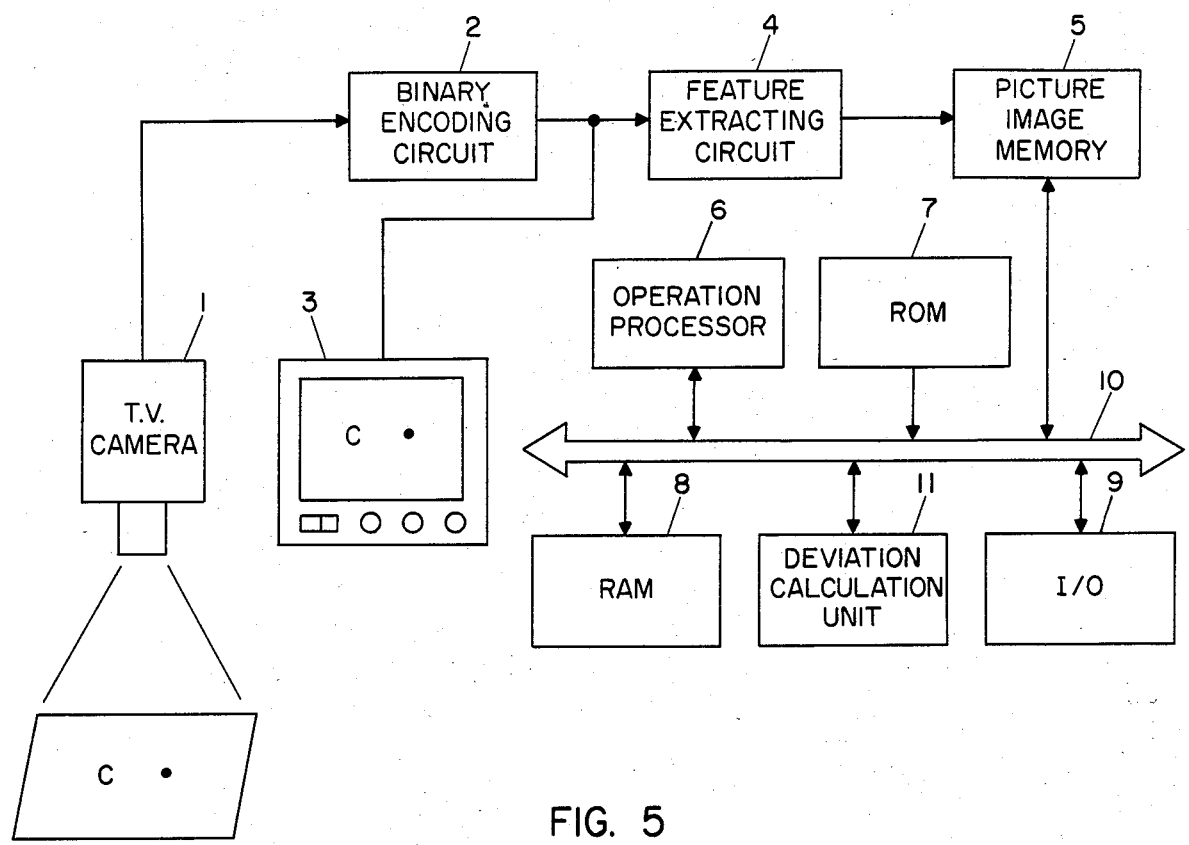
FIG. 5 is a schematic block diagram illustrating the overall arrangement of a representative embodiment of the present invention.
Figure 5A:
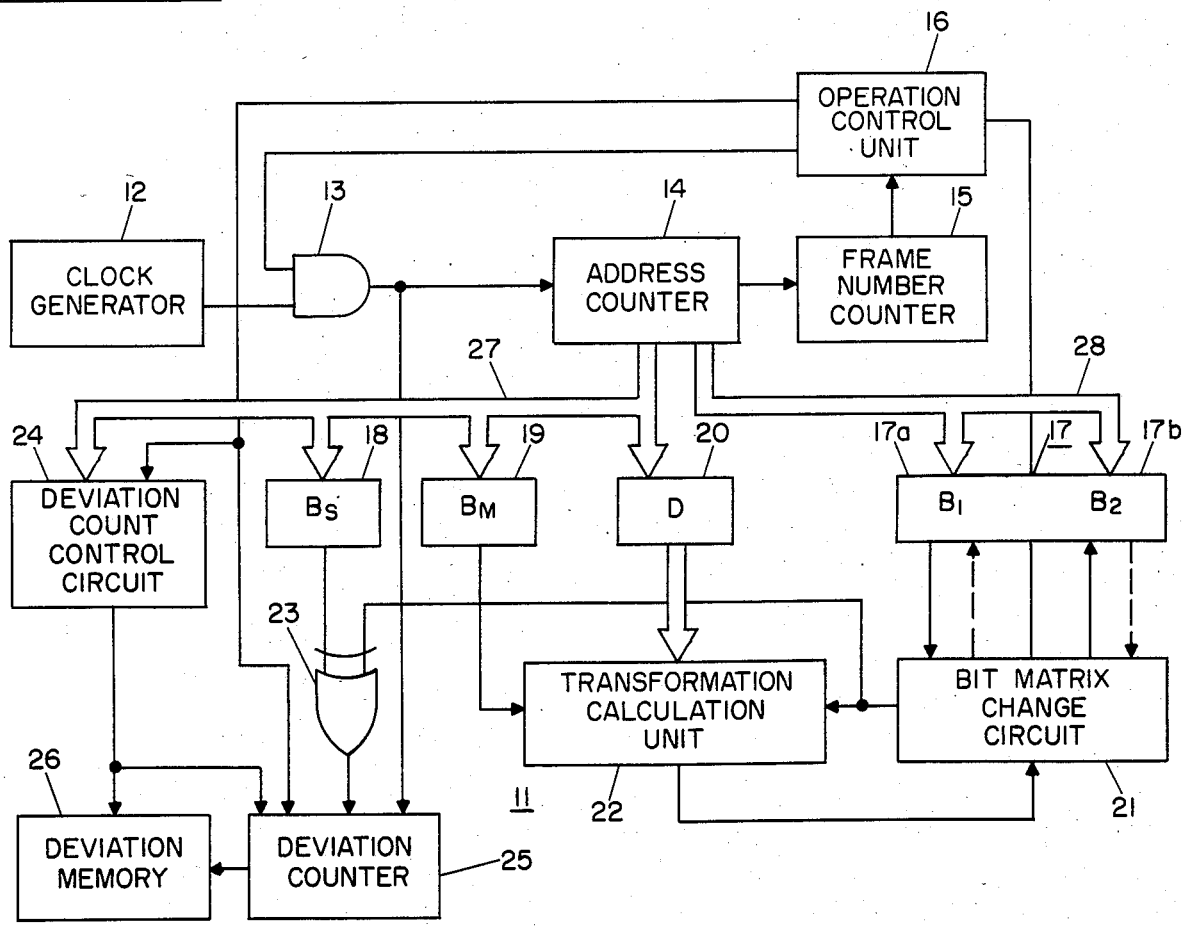
FIG. 5A is a schematic block diagram illustrating the arrangement of the deviation calculation circuit of FIG. 5.

In the representative embodiment of the invention shown in FIG. 5 a deviation calculation unit 11 which is controlled by an operation processor 6 is included. As shown in detail in FIG. 5A, the deviation calculation unit is composed of a clock generator circuit 12, an AND gate 13, an address counter circuit 14, a frame number counter circuit 15, an operation control unit 16, a memory unit containing memories 17a and 17b for storing a bit matrix B, a memory 18 for storing a standard bit matrix $B_S^K$, a memory 19 for storing a mask bit matrix $B_M^K$, a memory 20 for storing a transformation bit matrix D, a bit matrix change circuit 21, a transformation calculation circuit 22, an exclusive OR (EOR) gate 23, a deviation count control circuit 24, a deviation counter 25, a deviation memory 26, a cluster matrix address bus 27 and a bit matrix address bus 28.

A clock signal for effecting calculations is provided by the clock generator circuit 12. Whether or not the clock signal is to be supplied to each part is controlled by the gate 13 in accordance with a predetermined command from the operation control unit 16. The operation processor 6 sets the length l (the number of elements constituting a transformation chain) of a transformation chain into the operation control unit 16 and then starts the deviation calculation unit. Upon completion of the deviation calculation by the unit 11, the operation control unit 16 informs the operation processor 6 of the completion of the calculation. The operation processor 6 also measures the bit matrix B(i,j)(i=1 to N, j=1 to M) on the basis of the data delivered from the picture image memory 5 and writes the measured bit matrix B(i,j) into either of the memories constituting the memory unit 17, for example, the memory 17a. The memory unit 17 includes a pair of memories 17a and 17b and is adapted to store therein the result of the calculation by the transformation operator (i.e., the transformation element bit matrix) for each step of the calculation. It is to be noted that the transformation operation calculation is executed by alternately reading data into or writing data out of the memories 17a and 17b the number of times obtained by subtracting one from the length l of the transformation chain defined by a dictionary pattern, that is, (l−1) times at maximum.

On the other hand, the transformation operator is broken down into the transformation bit matrices D and is stored in the frame memory 20. The standard bit matrix $B_S^K$ and the mask bit matrix $B_M^K$ are also stored in the frame memories 18 and 19, respectively. In other words, the dictionary patterns for each character are all stored in the memories 18, 19 and 20 and can be rewritten by the operational processor 6 according to need.

An address for reading out each element of the bit matrix from each frame memory is produced in the counter circuit 14. More specifically, every time data are read out from a memory, a predetermined pulse is delivered from the counter circuit 14 to the frame number counter circuit 15. When the number of read out counts reaches l−1, a control signal is delivered from the operation control unit 16 to the deviation counter 25 to complete the counting of the deviation between the unknown pattern and a predetermined pattern and to shift the operation to the counting of the deviation between the unknown pattern and another pattern.

It is to be noted that, in the meantime, the transformation operation calculation shown in { } of the above-mentioned equation (1) is carried out between the transformation bit matrix D, the mask bit matrix $B_M^K$ and the bit matrix B, which is stored in either the memory 17a or the memory 17b, and the calculation result is written into the memory unit 17 again. That calculation is repeated l−1 times at most, as described above, and the number of times it is carried out is controlled by the operation control unit 16. In addition, it is possible to set in the address counter circuit 14 the size (N×M) of the bit matrix or the number of the dictionary patterns from the operational processor 6.

Both the bit matrix B', which is stored in the memory unit 17 as the result of the transformation operation calculation, and the standard bit matrix $B_S^K$, which is read out from the memory 18, are supplied to the gate 23, where both of them are XORed with each other, that is, the calculation of the distance $D^K$ represented by the above-mentioned equation (1) is carried out. In this case, in order to determine the deviation for each pattern while the circuit 24 controls the writing of the deviation count and is also being reset, the deviation between the unknown pattern and each standard pattern is successively counted by the counter 25, and the counting result is stored in the deviation memory 26.

The manner in which a transformation chain is expressed by transformation element bit matrices will be described hereinafter with reference to FIGS. 6 and 7A to 7I.

Figure 6:
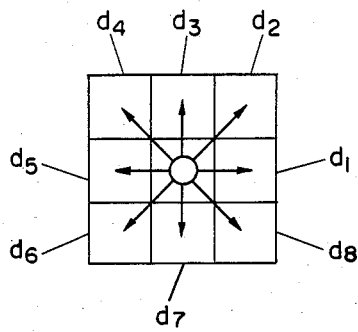
FIG. 6 is a schematic diagram useful in describing transformation element vectors.
Figure 7A:
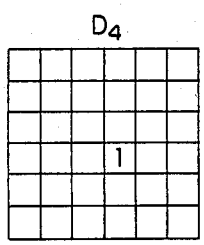
FIGS. 7A–7I are schematic diagrams useful in describing the relationship between a transformation operator and transformation element bit matrices.
Figure 7B:
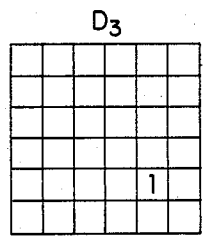
Figure 7C:
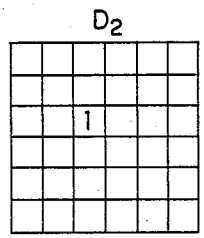
Figure 7D:
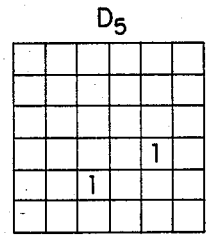
Figure 7E:
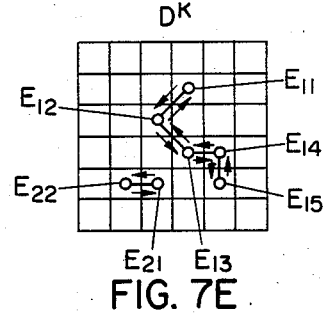
Figure 7F:
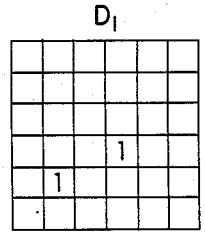
Figure 7G:
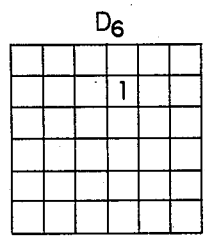
Figure 7H:
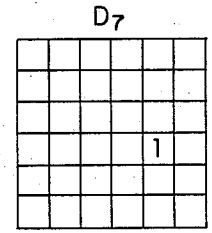
Figure 7I:
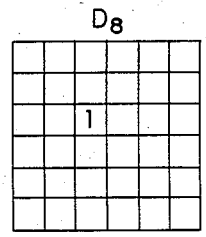

FIG. 6 shows transformation element vectors constituting a transformation chain. There are a total of eight transformation element vectors $d_1$ to $d_8$, that is, right and left, upper and lower, as well as diagonal transformation element vectors. An example including two transformation chains is shown in FIG. 7(F). There, one transformation chain contains transformation elements $E_{11}$ to $E_{15}$ and another transformation chain contains transformation elements $E_{21}$ and $E_{22}$. In this case, the elements $E_{13}$ and $E_{14}$ and $E_{21}$ and $E_{22}$ are in the horizontal direction. Accordingly, the right matrix $D_1$ shown in FIG. 7(F) has a "1" at the positions corresponding to the elements $E_{13}$ and $E_{22}$, and the left matrix $D_5$ shown in FIG. 7(D) has a "1" at the positions corresponding to the elements $E_{14}$ and $E_{21}$. In other words, in the right matrix $D_1$ a "1" is stored at the position corresponding to the transformation element at the left end of each transformation chain comprising elements connected in the horizontal direction, while in the left matrix $D_5$ a "1" is stored at the position corresponding to the transformation element at the right end of each transformation chain comprising elements connected in the horizontal direction. A similar relationship applies for the upper and lower matrices $D_3$ and $D_7$ shown in FIGS. 7(B) and 7(H), respectively, and for the diagonal matrices $D_2$ and $D_6$ and $D_4$ and $D_8$ shown in FIGS. 7(C), 7(G), 7(A) and 7(I) respectively, so that a "1" is stored at each position as illustrated in those diagrams. In this way, the transformation element bit matrices $D_1$ to $D_8$ are prepared.

It is to be noted that, although the size of each transformation bit matrix shown in FIGS. 7A to 7I is 6×6 for convenience, the size is generally M×N. The transformation element vector operates in such a way that, when an element in an unknown bit matrix B is a "1", the element indicated by the vector thereof is a "1" in the corresponding transformation element bit matrix. Accordingly, in the calculation by means of the transformation element vector, the transformation calculation is carried out only to the eight adjacent elements as represented in FIG. 6. Therefore, for a transformation chain having a length l, it is necessary to perform the transformation element vector calculation l−1 times at most. It is to be noted that these transformation element bit matrices for the dictionary patterns are stored in the memory 20 shown in FIG. 5A.

Figure 8:
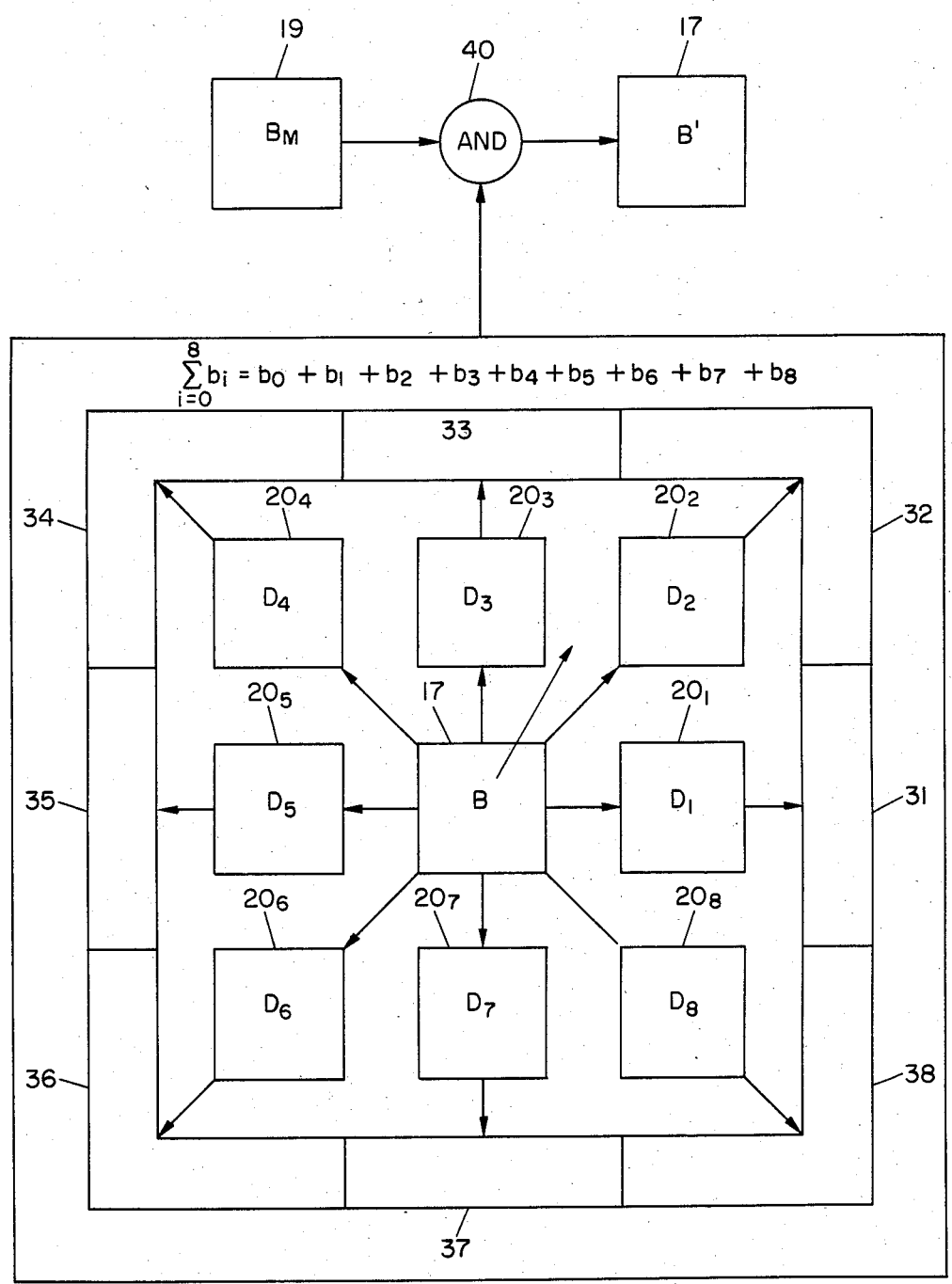
FIG. 8 is a schematic diagram showing the arrangement of a representative transformation operation calculation circuit which effects transformation and masking operations.

The construction of the transformation operation calculation unit adapted to effect the masking operation and the transformation operation by means of the thus obtained transformation element bit matrices $D_1$ to $D_8$ will be described hereinafter with reference to FIGS. 8 and 9A to 9I. In FIG. 8, a memory 17 stores an unknown bit matrix B and eight memories $20_1$ to $20_8$ store the transformation element bit matrices $D_1$ to $D_8$, respectively. The unit also includes eight two-dimensional local memories 31 to 38, a memory 19 for storing the mask bit matrix BKM, and an AND gate 40.

Figure 9A:
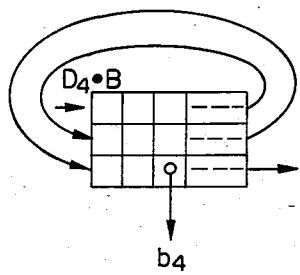
FIGS. 9A–9I are schematic illustrations showing the construction of two-dimensional local memories in FIG. 8.
Figure 9B:
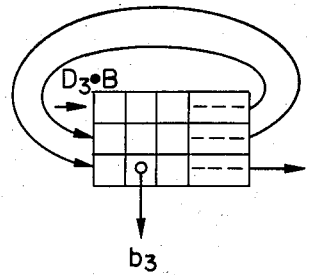
Figure 9C:
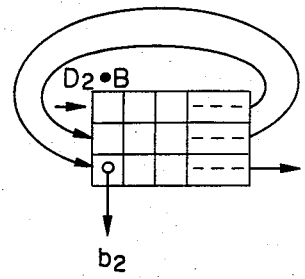
Figure 9D:
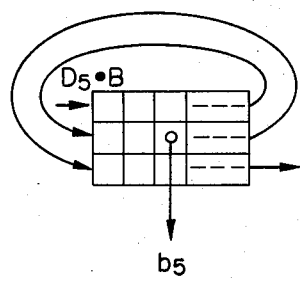
Figure 9E:
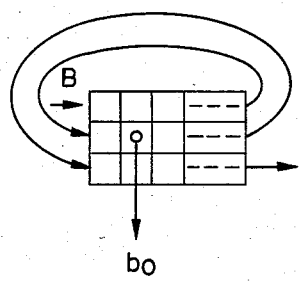
Figure 9F:
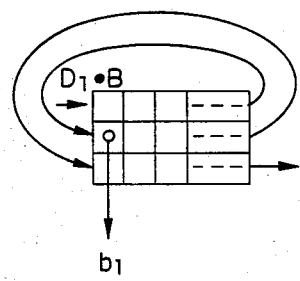
Figure 9G:
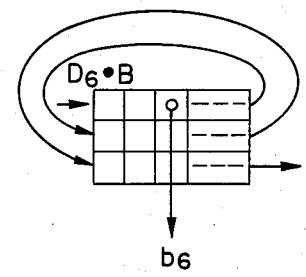
Figure 9H:
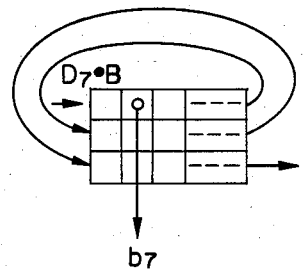
Figure 9I:
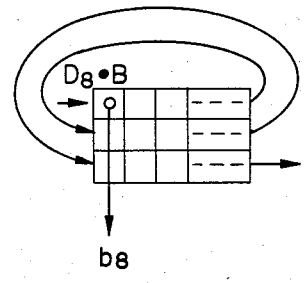

More specifically, the unknown bit matrix B and each of the transformation element bit matrices $D_1$ to $D_8$ are ANDed, and the results are respectively stored in the two-dimensional local memories 31 to 38. Each of the two-dimensional local memories 31 to 38 includes, for example, three shift registers, each having a predetermined capacity, which are superposed one upon another as illustrated in FIGS. 9A to 9I. The two-dimensional local memories 31 to 38 are arranged so that the AND outputs $b_0$ to $b_8$ of the unknown bit matrix B and the transformation element bit matrices $D_1$ to $D_8$ are successively read out for every 3×3 matrix. In this case, the outputs $b_1$ to $b_8$ are read out while being positioned with respect to each other so that when the transformation operation is effected the position of each of the outputs $b_1$ to $b_8$ is coincident with the position of the output $b_0$ as represented by the symbol "o" in FIGS. 9A to 9I. It is to be noted that FIG. 9A shows the local memory 34 of FIG. 8, FIGS. 9B, 9C and 9D, respectively, show the memories 33, 32 and 35, and FIGS. 9F, 9G, 9H and 9I, respectively, show the memories 31, 36, 37, 38, while FIG. 9E shows the memory 17 of FIG. 8. Accordingly, the memory 17 is also a two-dimensional memory.

The outputs $b_0$ to $b_8$ of the local memories are ORed with each other to calculate the total sum thereof, which is led to the AND gate 40 so as to be ANDed with the mask bit matrix $B_M{}^K$. In other words, the output from the local memories represents the result of the operation of $D(B(i,j))$ in the above-mentioned equation (1), and the output of the AND gate 40 represents the result of the operation of $B_M{}^K(i,j) \cdot D^K(B(i,j))$ in the equation (1). It is to be noted that the output of the AND gate 40 is stored in the memory 17. Further, although two memories 17 are shown in FIG. 8, these memories correspond to the memories 17a and 17b in FIG. 5A and are used alternately for the functions indicated in FIG. 8 every time the transformation element vector calculation is carried out. Thus, by separating a transformation chain into transformation element vectors in the eight directions, it becomes unnecessary to limit the kind of transformation chain only to a horizontal or vertical transformation chain as in the case of the prior art, and it is possible to handle transformation chains having any desired shapes.

The manner in which the deviation calculation is performed by the above-described arrangement will be described hereinafter with respect to FIGS. 10A to 10F and 11A to 11D. FIGS. 10A to 10F are illustrations for describing transformation element bit matrices and an unknown bit matrix, while FIGS. 11A to 11D are illustrations for describing the results of processing carried out by the transformation operation calculation circuit.

Figure 10A:
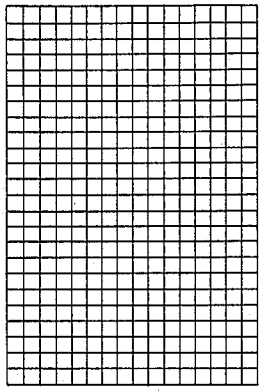
FIGS. 10A–10I are schematic diagrams useful in describing the relationship between transformation element bit matrices and an unknown bit matrix.
Figure 10B:
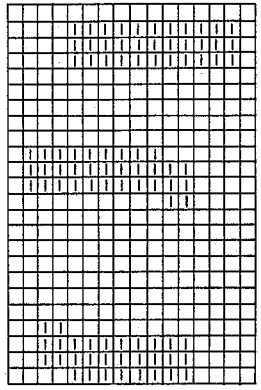
Figure 10C:
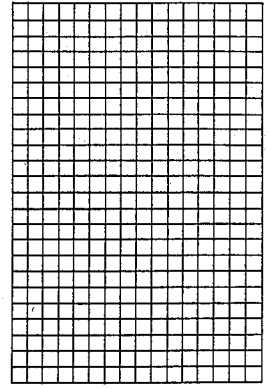
Figure 10D:
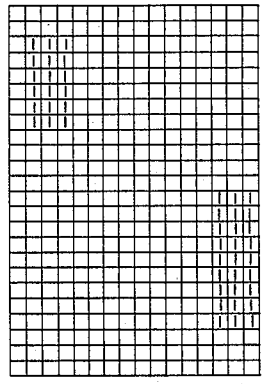
Figure 10E:
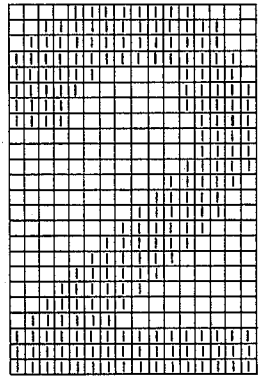
Figure 10F:
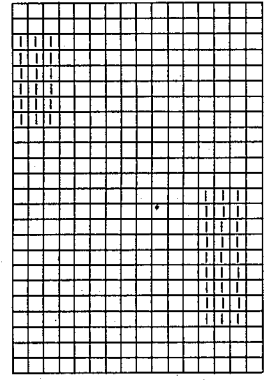
Figure 10G:
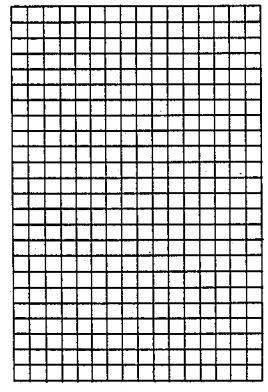
Figure 10H:
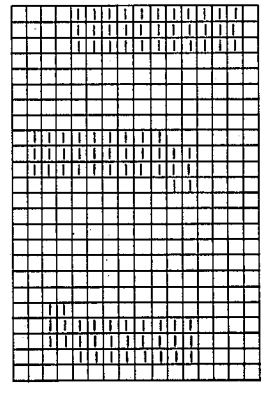
Figure 10I:
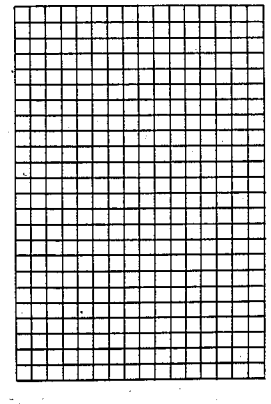
Figure 11A:
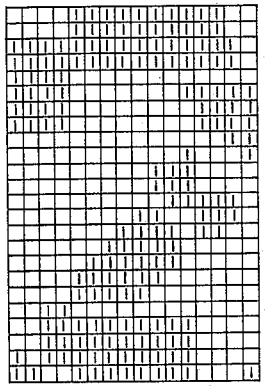
FIGS. 11A–11D are schematic diagrams useful in describing the result of processing by the transformation operation calculation circuit.

This example shows the case where, as an unknown pattern, a numeral "2" is read and the deviation between the numeral "2" and the numeral "5" as shown in FIGS. 2 to 4 is calculated. The unknown bit matrix B is represented as shown in FIG. 10E, while the transformation element bit matrices of the numeral "5" are respectively represented as shown in FIGS. 10A to 10D and 10F to 10I. It is to be noted that in this case, as will be clear from FIG. 2, all the four transformation element bit matrices of FIGS. 10A, 10C and 10I, which express diagonal transformation chains, are "0" since there are only horizontal and vertical transformation chains. By the first transformation element vector calculation and the masking operation by means of the bit matrix $B_M{}^K$ as shown in FIG. 4, the unknown pattern "2" is changed so that, as shown in FIG. 11A, the portions thereof corresponding to the mask elements are changed to "0" and the portions thereof corresponding to the transformation elements are propogated by the transformation vectors.

Figure 11B:
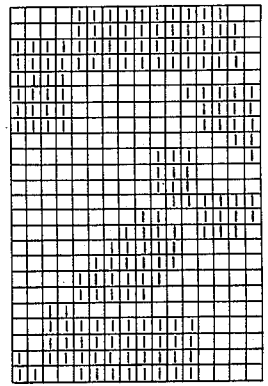
Figure 11C:
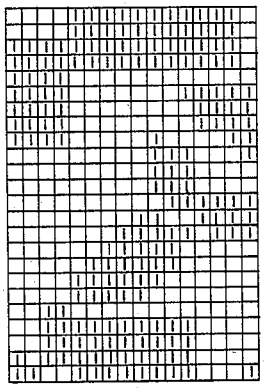
Figure 11D:
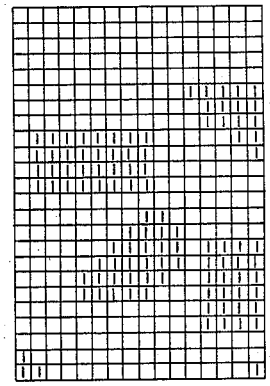

Then, the unknown pattern "2" is changed as shown in FIGS. 11B and 11C by the second and third calculations, respectively. In this case, since the maximum length l of the transformation chain is l=4, the transformation element vector calculation is carried out only three times, and finally, by the third calculation, a bit matrix $B^{(3)}$ as shown in FIG. 11C is obtained. The bit matrix $B^{(3)}$ and the standard bit matrix $B_S{}^K$ as shown in FIG. 3 are XORed with each other by the EOR gate 23 shown in FIG. 5A, and elements which are not coincident with each other are read out. Therefore, by counting the number of elements with the counter 25, it is possible to obtain the deviation $D^K$. It is to be noted that the result of the XOR operation is represented as shown in FIG. 11D, and the deviation is obtained as the number "104".

It should also be noted that, although in the above description reference is made to only one dictionary pattern, there are many dictionary patterns for other cases. For example, in the case of numerals there are ten patterns, that is, "0" to "9", and in the case of the English alphabet there are twenty-six patterns. Consequently, a plurality of deviations are calculated for each unknown pattern. Therefore, it will be understood that in such cases the number of the standard bit matrices $B_S{}^K$, mask bit matrices $B_M{}^K$ and transformation element bit matrices $D_1$ to $D_8$ stored in each memory corresponds to the number of the characters or patterns.

In accordance with the invention as described above, it is possible to perform a higher-speed deviation calculation and therefore to increase the character reading speed. In addition, the introduction of the concept of transformation element vectors permits transformation chains of all types to be handled without reducing the processing speed. Accordingly, it is possible to provide highly adaptable character reading.

I claim:
1. A pattern recognition apparatus comprising:
   (a) means for scanning an unknown pattern and providing a video signal corresponding to an image of the unknown pattern;

(b) binary encoding means for dividing the image into an array of pixel elements and converting the video signals into binary values using a threshold level, each of the binary values corrsponding to a respective one of the pixel elements;

(c) feature extracting means for converting the binary vlaues corresponding to the pixel elements into segments corresponding to the image, each segment being a horizontal series of pixel elements having a first binary value;

(d) memory means for storing the segments corresponding to the image and data representing a pluraltiy of standard patterns K, the data representing each one of the standard patterns comprising:

(i) a standard bit matrix $B_S^K(i,j)$ derived by dividing an image of the standard pattern into a specified array of meshes, each one of the meshes corresponding to a respective element of the matrix $B_S^K(i,j)$, each element of the matrix having the first or a second binary value depending respectively upon whether or not a portion of the standard pattern is present in the corresponding mesh, the matrix $B_S^K(i,j)$ being reducible to a corresponding cluster expression matrix having mask elements, blank elements, and transformation elements of a transformation chain, (ii) a mask bit matrix $B_M^K(i,j)$ having elements corresponding to respectivel ones of the meshes of the specified array, each element of the matrix $B_M^K(i,j)$ having the second or the first binary value depending respectively upon whether or not the element is a mask element, (iii) transformation bit matrices $D_1$, $D_2$, $D_3$, $D_4$, $D_5$, $D_6$, $D_7$ and $D_8$ each having elements of a first binary value if the elements of $D_1$ to $D_8$ correspond respectively to a present transformation element at the left end of a horizontal transformation chain, at the lower left end of a diagonal transformation chain, at the lower end of a vertical transformation chain, at the lower right end of a diagonal transformation chain, at the right end of a horizontal transformation chain, at the upper right end of a diagonal transformation chain, and at the upper end of a vertical transformation chain, at the upper left end of a diagonal transformation chain;

e. operating means for performing preprogrammed operations on the data stored in the memory means inclduing:

(i) means for comparing a width and a height of the unknown pattern with the width and height of a search frame, (ii) means for dividing the image of the unknown pattern into the specified array of meshes and deriving a bit matrix B(i,j) of the image having elements corresponding to reapective ones of the meshes of the specified array, each element of the matrix B(i,j) having the first or the second binary value depending respectively upon whether or not a portion of the unknown pattern is present in the corresponding mesh, (iii) means for matching the unknown pattern to one of the standard patterns by computing the deviation $D^K(B)$ between the unknown pattern and each one of the standard patterns, the deviation $D^K(B)$ being computed by performing a prescribed operation on at least a corresponding block of the matrix B(i,j) and the matrices $B_S^K(i,j)$, $B_M^K(i,j)$, $D_1$ to $D_8$, representing each one of the standard patterns wherein the prescribed operation is defined as $$D^K(B) = \sum_{i=1}^{M} \sum_{j=1}^{N} [B_S^K(i,j) \oplus \{B_M^K(i,j) \cdot D^K(B(i,j))\}],$$

where $D^K$ is a transformation matrix operator comprising transformation bit matrices $D_1$ to $D_8$ for the standard pattern K.

2. A pattern recognition apparatus according to claim 1, wherein the prescribed operation is performed to identify one of the standard patterns providing the smallest deviation $d_1$ and another one of the standard patterns providing the second smallest deviation $d_2$ and wherein the unknown pattern is matched to the one of the standard patterns providing the smallest deviation $d_1$, if $d_1$ and $d_2$ satisfy the criteria $$d_1 \leq d_U \text{ and}$$

$$d_2 - d_1 \geq d_L,$$

where $d_U$ and $d_L$ are predetermined limits.

3. In a pattern recognition apparatus comprising (a) means for scanning an unknown pattern and providing a video signal corresponding to an image of the unknown pattern;

(b) binary encoding means for dividing the image into an array of pixel elements and converting the video signals into binary values using a threshold level, each of the binary values corresponding to a respectivel one of the pixel elements;

(c) feature extracting means for converting the binary values corresponding to the pixel elements into segments corresponding to the image, each segment being a horizontal series of pixel elements having a first binary value;

(d) storing means for storing the segments corresponding to the image;

(e) operating means for performing preprogrammed operations on the segments corresponding to the image including:

(i) means for comparing a width and a height of the unknown pattern with the width and height of a search frame;

(ii) means for dividing the image of the unknown pattern into a specified array of meshes and deriving a bit matrix B(i,j) of the image having elements corresponding to respective ones of meshes of the specified array, each element of the matrix B(i,j) having the first or a second binary value depending respectively upon whether or not a portion of the unknown pattern is present in the corresponding mesh;

a deviation calculation unit, comprising:

first memory means for storing the data respresenting a pluraltiy of standard bit matrices $B_S^K(i,j)$ for each one of a plurality of standard patterns K, said standard bit matrix being derived by dividing an image of the standard pattern into specified array of meshes, each one of the meshes corresponding to a respective element of the matrix $B_S^K(i,j)$, each element of the matrix having the first or the second binary value depending respectively upon whether or not a portion of the standard pattern is present in the corresponding mesh, the matrix $B_S^K(i,j)$ being reducible to a corresponding cluster expression matrix having mask elements, blank elements, and transformation elements of a transformation chain;

second memory means for storing the data representing a mask bit matrix B (i,j) for each one of the standard patterns, said mask bit matrix B (i,j) having elements corresponding to respecitve ones of the meshes of the specified array, each element of the matrix B (i,j) having the second or the first binary value depending respectively upon whether or not the element is a mask element;

third memory means for storing transformation bit matrices $D_1$, $D_2$, $D_3$, $D_4$, $D_5$, $D_6$, $D_7$ and $D_8$, for each of the stanrdar patterns, where each matrix has elements of a first binary value if the elements of $D_1$ to $D_8$ correspond respectively to a present transformation element at the left end of a horizontal transformation chain, at the lower left end of a diagonal transformation chain, at the lower end of a vertical transformation chain, at the lower right end of a diagonal transformation chain, at the right end of a horizontal transformation chain, at the upper right end of a diagonal transformation chain, at the upper end of a vertical transformation chain, at the upper left end of a diagonal transformation chain;

fourth memory means for storing said bit matrix B(i,j) for the unknown pattern;

deviation calculating means for matching the unknown pattern to one of the standard patterns by computing the deviation $D^K(B)$ between the unknown pattern and each of the standard patterns, the deviation $D^K(B)$ being computed by performing a prescribed operation on at least a corresponding block of the matrix B(i,j) and the matrices $B_S^K(i,j)$, $B_M^K(i,j)$ and $D_1$ to $D_8$ representing each one of the standard patterns, wherein the prescribed operation is defined as $$D^K(B) = \sum_{i=1}^{M} \sum_{j=1}^{N} [B_S^K(i,j) \oplus \{B_M^K(i,j) \cdot D^K(B(i,j))\}],$$

where $D^K$ is a transformation operator comprising transformation matrices $D_1$ to $D_8$ for the stanrdard pattern K.

4. The deviation calculation unit of claim 3, wherein said deviation calculating means includes:

transformation calculating means and for performing the prescribed operation $B_M^K(i,j) \cdot D^K(B(i,j))$, $1-1$ times, said calculating means including
(i) means for logically AND-ing said transformation bit matrices with said bit matrix B(i,j) to obtain eight distinct values,
(ii) means for logically OR-ing said distinct values to obtain a ninth value,
(iii) means for logically AND-ing said ninth value with said mask matrix $B_M^K(i,j)$ to obtain a tenth value,
(iv) means for substituting said bit matrix B(i,j) with said tenth value, where l represents the length of the transformation chain of the standard pattern K;

and gating means for logically XOR-ing said tenth value with said standard bit matrix to obtain the deviation $D_K(B)$ between the unknown pattern and the standard pattern.

5. The deviation calculation unit of claim 3, wherein said transformation calculating means includes a plurality of two-dimensional memory means, each including a pluraltiy of shift registers of a predetermined capacity, arranged to successively read out data resulting from logically AND-ing the transformation matrices $D_1$ to $D_8$ with the bit matrix B(i,j) of the unknown character.

* * * * *